Sept. 22, 1931.  H. EISENBERG  1,824,596

PIPE CLAMP

Filed April 22, 1930

INVENTOR
HENRY EISENBERG
BY
ATTORNEY

Patented Sept. 22, 1931

1,824,596

UNITED STATES PATENT OFFICE

HENRY EISENBERG, OF NEW YORK, N. Y.

PIPE CLAMP

Application filed April 22, 1930. Serial No. 446,236.

This invention relates to pipe repairing devices, more particularly to pipe clamps.

One of the objects of the invention is to provide a new and improved pipe clamp which can be manufactured at a very low cost.

Another object of the invention is to provide a pipe clamp which is more easily applied to and removed from a pipe than has obtained in pipe clamps as hitherto constructed.

Other objects of the invention will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
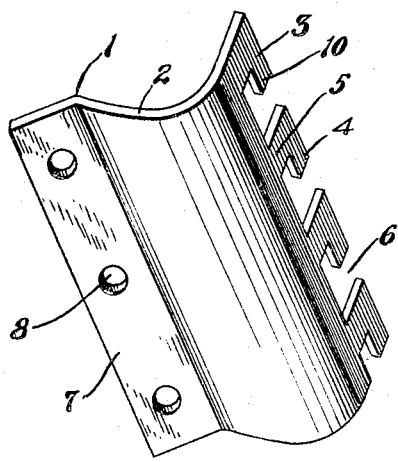
Figure 2:
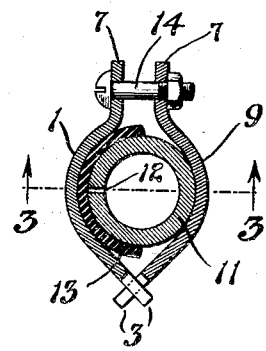
Figure 4:
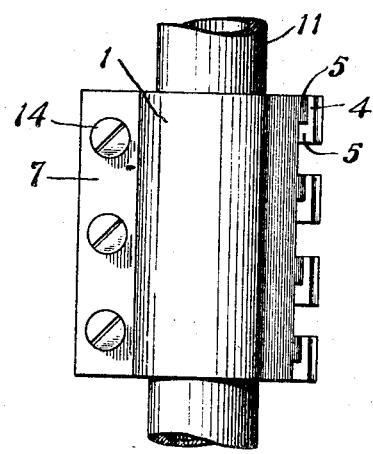
Figure 3:
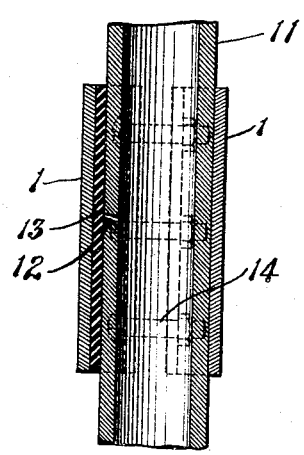

In the accompanying drawings, wherein I have illustrated a preferred form of embodiment of my invention, Figure 1 is a view in perspective of one of the clamping members of my improved pipe clamp, Figure 2 is a cross sectional view taken on the line 2—2 of Figure 4, Figure 3 is a longitudinal sectional view taken on the line 3—3 of Figure 2, and Figure 4 is an elevational view showing the device positioned upon a pipe.

Referring now to the drawings, wherein similar reference characters refer to similar parts in the several views thereof, the reference numeral 1 denotes one of the clamp members, the same having a rounded part 2 adapted to fit about a pipe.

One of the edges of this clamp member is cut away to provide a plurality of hook members 3, all of which hook members have their engaging parts 4 extended in the same direction. Each of the hook members comprises a neck 5 and the hook member 4 and each hook member is separated from its neighbor by a space 6.

The opposite edge of the clamp member 1 is flattened out as clearly shown in Figures 1 and 2 said flattened portion, indicated at 7, being provided with a plurality of apertures 8.

The clamp it will be noted is formed of two similar parts 1 and 9, the construction of the clamp member 9 corresponding in all respects with the clamp member 1.

It will be noted that the engaging edge 10 of each of the hook members 3 lies in a direction parallel with the longitudinal axis of the clamp and that the space within each of the hook members is defined by rectangularly disposed edges.

In assembling the clamp two of the clamping members such as 1 and 9 are held in reversed positions relatively to each other and the necks 5 of each of the clamp members are passed through the proper space 6 separating the respective hook members. When this has been accomplished the clamp members are moved in a longitudinal direction relatively to each other. When this has been accomplished the clamp members such as 1 and 9 are positioned upon a pipe indicated at 11, as shown in Figure 2.

Assuming that an aperture such as shown at 12 in Figure 2 is to be closed, a rubber gasket 13 is preferably positioned over the opening to be closed as shown in Figure 2. The clamp members 1 and 9 are then securely clamped about the pipe 11 and the gasket 13 as by means of the clamp bolts 14 which are extended through the registering apertures 8 of the respective clamp members.

Thus it will be seen that the clamp may be assembled by a simple operation such as is above described. To remove the clamp from the pipe it is merely necessary to remove the nuts of the clamp bolts 4 whereupon the clamp members will fall apart.

It will be noted that the clamp members 1 and 9 are identically constructed and that both may be cut from sheet metal by the same die.

As many changes could be made in the above construction and many apparently widely different embodiments of this invention could be made without departing from the scope thereof, it is intended that all matter contained in the above description or shown in the accompanying drawings shall be interpreted as illustrative only and not in a limiting sense.

It is also to be understood that the language used in the following claims is intended to cover all of the generic and specific features of the invention herein described, and all statements of the scope of the invention, which, as a matter of language might be said to fall therebetween.

Having thus described my invention, what I claim as new and desire to secure by Letters Patent is:

1. A clamp comprising a pair of mutually engaged members having rounded portions adapted to fit about a portion of a pipe, said members having their edges provided with oppositely extending, longitudinally interlocking projections, and means passing through the opposite edges of said members for securing them to a pipe.

2. A pipe clamp comprising a pair of clamp members, each being provided with a rounded portion adapted to fit about a portion of a pipe, each member having one of its lateral edges provided with a plurality of longitudinally extending, hook shaped projections adapted for mutual engagement with the similarly disposed hook shaped members of the other clamp member, the opposite edges of said clamp members being apertured, and means adapted to pass through said apertures for holding said clamp members in position upon a pipe.

3. A clamp comprising a pair of similarly formed clamp members, each of which is provided with a rounded portion adapted to fit about a pipe, each of said clamp members being provided upon one of its lateral edges with a plurality of laterally and longitudinally extending hook shaped projections adapted for mutual engagement with the hook shaped members upon the lateral edge of the other of said members, the opposite lateral edge of each of said clamp members being apertured, and clamp bolts extending through said apertures whereby tightly to hold said assembly upon a pipe.

4. A pipe clamp comprising a pair of clamp members each of which is provided with a rounded portion, and each of said clamp members having one of its lateral edges provided with a plurality of longitudinally extending hook shaped projections, the hook shaped parts of each of said clamp members extending in the same longitudinal direction, the hook shaped parts upon each of said clamp members being adapted to engage with each other when said clamp members are moved relatively in a longitudinal direction, each of said clamp members having their opposite edges provided with apertures, and clamp bolts extending through said apertures whereby to fasten said clamp members about a pipe.

5. As a new article of manufacture, a pipe clamp member having a rounded portion, one of the lateral edges of said member being provided with a plurality of longitudinally extending hook shaped members, and its opposite edge provided with a plurality of apertures.

HENRY EISENBERG.